(12) United States Patent
Fukuzawa et al.

(10) Patent No.: US 10,508,018 B2
(45) Date of Patent: Dec. 17, 2019

(54) COVER ATTACHING DEVICE AND METHOD FOR ATTACHING A COVER TO A SEAT COVER

(71) Applicant: YKK Corporation, Tokyo (JP)

(72) Inventors: Tetsuya Fukuzawa, Toyama (JP); Shinsuke Saiga, Tokyo (JP); Yoshitomo Iyoda, Tokyo (JP)

(73) Assignee: YKK Corporation (JP)

( * ) Notice: Subject to any disclaimer, the term of this patent is extended or adjusted under 35 U.S.C. 154(b) by 274 days.

(21) Appl. No.: 15/318,663

(22) PCT Filed: Jun. 25, 2014

(86) PCT No.: PCT/JP2014/066909
§ 371 (c)(1),
(2) Date: Dec. 13, 2016

(87) PCT Pub. No.: WO2015/198430
PCT Pub. Date: Dec. 30, 2015

(65) Prior Publication Data
US 2017/0129766 A1    May 11, 2017

(51) Int. Cl.
*B68G 7/05*    (2006.01)
*B68G 15/00*   (2006.01)
(Continued)

(52) U.S. Cl.
CPC .............. *B68G 7/051* (2013.01); *A47C 7/24* (2013.01); *B60N 2/5825* (2013.01);
(Continued)

(58) Field of Classification Search
CPC .......... B68G 15/00; B68G 7/051; B68G 7/12; B60N 2/5891; Y10T 29/48; A47C 31/023
(Continued)

(56) References Cited

U.S. PATENT DOCUMENTS 3,871,041 A * 3/1975 Plume ................. A47C 31/023
                                                    5/402
4,385,427 A * 5/1983 Fraiser .............. B29D 99/0092
                                                    29/91
(Continued)

FOREIGN PATENT DOCUMENTS

DE        4219943 C1 *    2/1993    ........... B60N 2/5825
JP        31699/1993      4/1993
(Continued)

OTHER PUBLICATIONS

Machine Translation of DE4219943 (Year: 1993).*
(Continued)

*Primary Examiner* — Jacob J Cigna
*Assistant Examiner* — Michael W Hotchkiss
(74) *Attorney, Agent, or Firm* — Kilpatrick Townsend & Stockton LLP

(57) ABSTRACT

A cover attaching device for attaching a cover to a seat body is disclosed. This device comprises a cover holder which includes one or more clip holding means capable of holding at least one clip, the cover holder being configured to hold the cover, to which the clip has been attached, via the clip being held by the clip holding means; and a distance adjusting means capable of adjusting a distance between the cover holder and a table on which the seat body can be placed.

20 Claims, 20 Drawing Sheets

(51) Int. Cl.
*A47C 7/24* (2006.01)
*B60N 2/58* (2006.01)
*B68G 7/12* (2006.01)
*B60N 2/70* (2006.01)
*B60N 2/72* (2006.01)

(52) U.S. Cl.
CPC ......... *B60N 2/5833* (2013.01); *B60N 2/7017* (2013.01); *B60N 2/72* (2013.01); *B68G 7/05* (2013.01); *B68G 7/12* (2013.01); *B68G 15/00* (2013.01)

(58) Field of Classification Search
USPC .......................................................... 29/91.5
See application file for complete search history.

(56) References Cited

U.S. PATENT DOCUMENTS

| | | | | |
|---|---|---|---|---|
| 4,786,351 | A * | 11/1988 | Elliott | B29C 44/5636 156/245 |
| 5,518,292 | A * | 5/1996 | Cozzani | A47C 31/023 24/301 |
| 5,586,377 | A * | 12/1996 | Katsuta | B68G 7/05 29/281.3 |
| 5,820,213 | A * | 10/1998 | Severinski | A47C 31/023 297/218.5 |
| 6,145,904 | A * | 11/2000 | Bellandi | B25J 15/0226 294/116 |
| 6,253,435 | B1 * | 7/2001 | Mintz | B68G 7/051 29/91.5 |
| 6,298,532 | B1 * | 10/2001 | Walt, II | B68G 7/05 29/235 |
| 6,629,346 | B2 * | 10/2003 | Tillner | A47C 31/023 29/281.5 |
| 7,490,401 | B2 * | 2/2009 | Mossbeck | B21F 15/04 227/100 |
| 7,562,443 | B2 * | 7/2009 | Rowe | G05B 19/41805 227/110 |
| 7,901,002 | B2 * | 3/2011 | Mashimo | B60N 2/5825 297/218.3 |
| 8,245,377 | B2 * | 8/2012 | Ormachea | B68G 7/05 269/37 |
| 8,347,472 | B2 | 1/2013 | Nanjo | |
| 8,882,203 | B2 * | 11/2014 | Takehara | A47C 31/023 297/218.2 |
| 2002/0108222 | A1 * | 8/2002 | Tillner | A47C 31/023 29/91.1 |
| 2014/0068900 | A1 * | 3/2014 | Lovasz | A47C 31/023 24/543 |
| 2014/0352117 | A1 * | 12/2014 | Murasaki | A47C 31/023 24/581.11 |

FOREIGN PATENT DOCUMENTS

| | | | |
|---|---|---|---|
| JP | 0531699 U * | 4/1993 | ............ B68G 7/052 |
| JP | 2001-38074 A | 2/2001 | |
| JP | 4997585 B2 | 8/2012 | |
| WO | 2013/069114 A1 | 5/2013 | |

OTHER PUBLICATIONS

Machine Translation of JP0531699 (Year: 1993).*
Machine Translation of JP0531699U (Year: 1993).*
International Preliminary Report on Patentability, PCT International Patent Application No. PCT/JP2014/066909, dated Jan. 5, 2017.
International Search Report, PCT International Patent Application No. PCT/JP2014/066909, dated Jul. 29, 2014.

* cited by examiner

COVER ATTACHING DEVICE AND METHOD FOR ATTACHING A COVER TO A SEAT COVER

This application is a national stage application of PCT/JP2014/066909, which is incorporated herein by reference.

TECHNICAL FIELD

The present disclosure relates to a cover attaching device and a method for attaching a cover to a seat body.

BACKGROUND ART

Seats of various movable bodies such as two-wheeled vehicles, four-wheeled vehicles, trains, aircraft, ships, submersible boats, etc. may be manufactured by covering a resin foam forming a seat body with a cover. A method of connecting the seat body side and the cover side via a clip is known in the art.

Patent Document 1 discloses a tool for attaching a clip to a wire. As can be seen from FIGS. 6 and 7 of this document, the clip is engaged with the wire by advancing the clip holder.

CITATION LIST

Patent Document 1: Japanese Patent No. 4997585

SUMMARY OF INVENTION

Technical Problem

In response to a request for improving an efficiency of seat production, there is a need to efficiently attach the cover to the resin foam of the seat body to coat it. The technique disclosed in Patent Document 1 requires attaching works by a human and limits improvement of producibility. Thus, there is a need for improved efficiency of attachment of the cover to the seat body.

Solution to Problem

A cover attaching device according to one aspect of the present invention is a cover attaching device (100) for attaching a cover (600) to a seat body (700), comprising: a cover holder (200) that includes one or more clip holding means (260, 240) capable of holding at least one clip (800), the cover holder (20) being configured to hold the cover (600), to which the clip (800) has been attached, via the clip (800) being held by the clip holding means (260, 240); and a distance adjusting means (500) capable of adjusting a distance between the cover holder (200) and a table (300) on which the seat body (700) can be placed, wherein operation of the distance adjusting means (500) causes the clip (800) held by the clip holding means (260, 240) to be brought into engagement with the side of the seat body (700) placed on the table (300).

In some embodiments, the distance adjusting means (500) is configured to move the cover holder (200) toward the side of the table (300).

In some embodiments, the clip holding means (260) comprises an axial clip gripper (260) having a clip gripping body (240) secured to a movable shaft (235) of a cylinder (230), and is configured to displace the clip (800) grasped by the clip gripping body (240) toward the seat body (700) placed on the table (300) in accordance with operation of the cylinder (230).

In some embodiments, the distance adjusting means (500) comprises a flat plate portion (210) provided with at least two clip holding means (260, 240), and the flat plate portion (210) is disposed above the table (300), and the cover (600) is held above the table (300) by the clip (800) being held by the clip holding means (260, 240).

In some embodiments, the cover holder (200) comprises one or more clip pushing means (270, 250) for pushing the clip (800) for engagement with the seat body (700).

In some embodiments, the clip pushing means (270) comprises an axial clip pusher (270) having a clip pushing body (250) secured to a movable shaft (235) of a cylinder (230), and is configured to push the clip (800) toward the seat body (700) placed on the table (300) in accordance with operation of the cylinder (230).

In some embodiments, the cover holder (200) includes a first line arrangement (220) in which the one or more clip holding means (260) and the one or more clip pushing means (270) are arranged; and a second line arrangement (220) in which the one or more clip holding means (260) and the one or more clip pushing means (270) are arranged.

A method according to another aspect of the present invention provides a method for attaching a cover (600) to a seat body (700), comprising the steps of:
placing the seat body (700) on a table (300);
attaching at least one clip (800) to the cover (600);
attaching the clip to one or more clip gripping body (240) of a cover holder (200), thereby the clip (800) being gripped by the one or more clip gripping bodies (240); and narrowing a distance between the table (300) and the cover holder (200) in a state where the cover (600) has been held on the cover holder (200) via the clip (800) and the seat body (700) has been placed on the table (300).

In some embodiments, the method further comprises the step of pushing the clip (800) by a clip pushing body (250) of the cover holder (200).

Advantageous Effects of Invention

According to one aspect of the present invention, the efficiency of attaching steps of the cover to the seat body can be improved.

DESCRIPTION OF EMBODIMENTS

Hereinafter, embodiments of the present invention will be described with reference to the drawings. Respective embodiments are not mutually exclusive, and the skilled person could properly combine them without requiring excess descriptions and could understand the synergic effects by such combinations. Overlapping descriptions among embodiments will be basically omitted. Referenced drawings are mainly for the purpose of illustrating the invention and may be simplified in an appropriate manner.
<First Embodiment>

Figure 1:
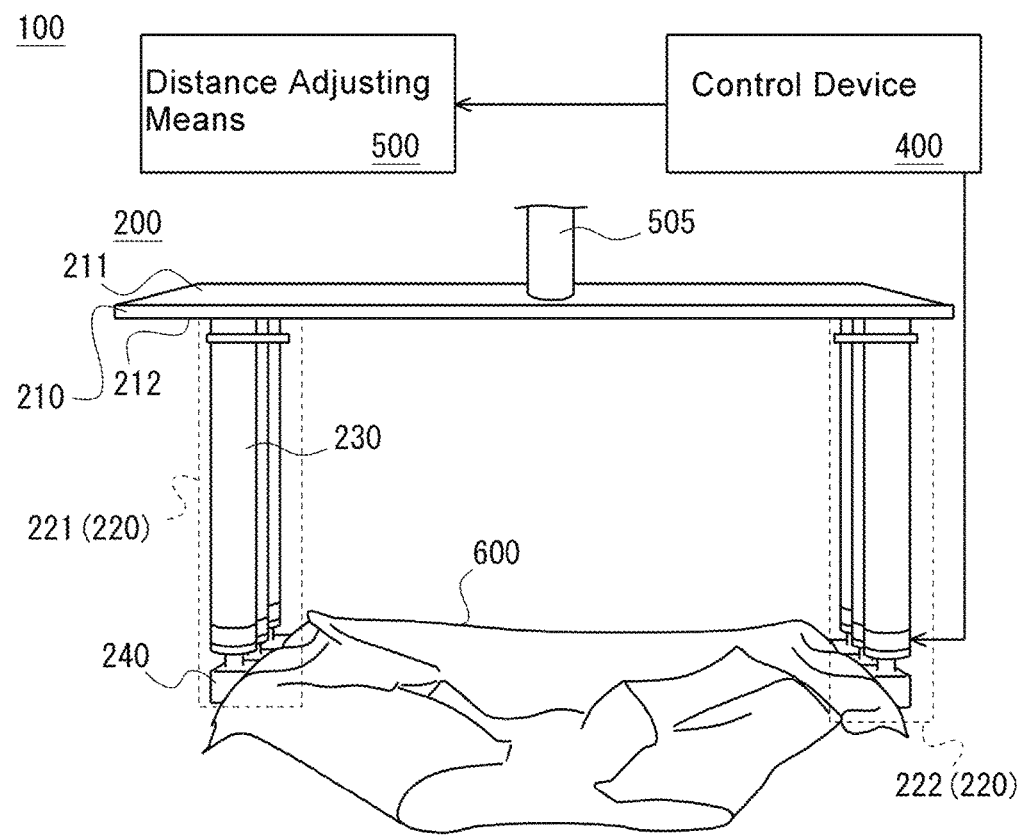
FIG. 1 is a schematic view showing schematic configuration of a cover attaching device according to a first embodiment of the present invention, which schematically shows a cover holder and a table in a perspective view, and which schematically shows other configuration by blocks. It is noted that in this figure, it shows a state where a cover has been held on the cover holder, and a seat body indicated by dotted lines has been placed on the table.
Figure 1:
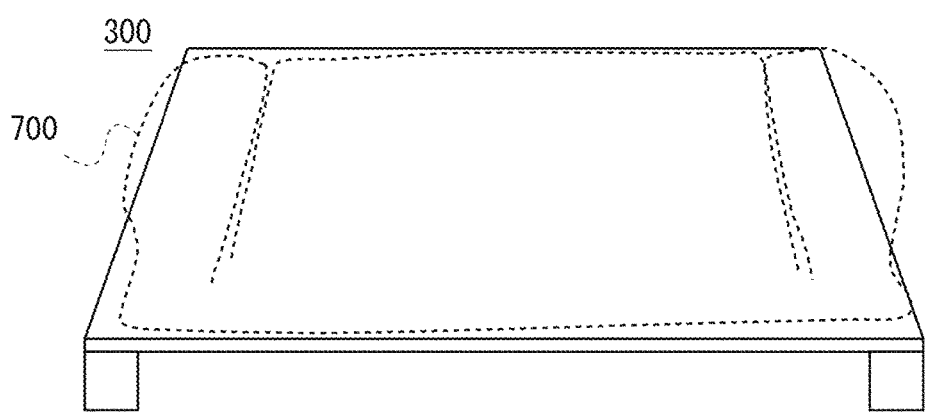
Figure 2:
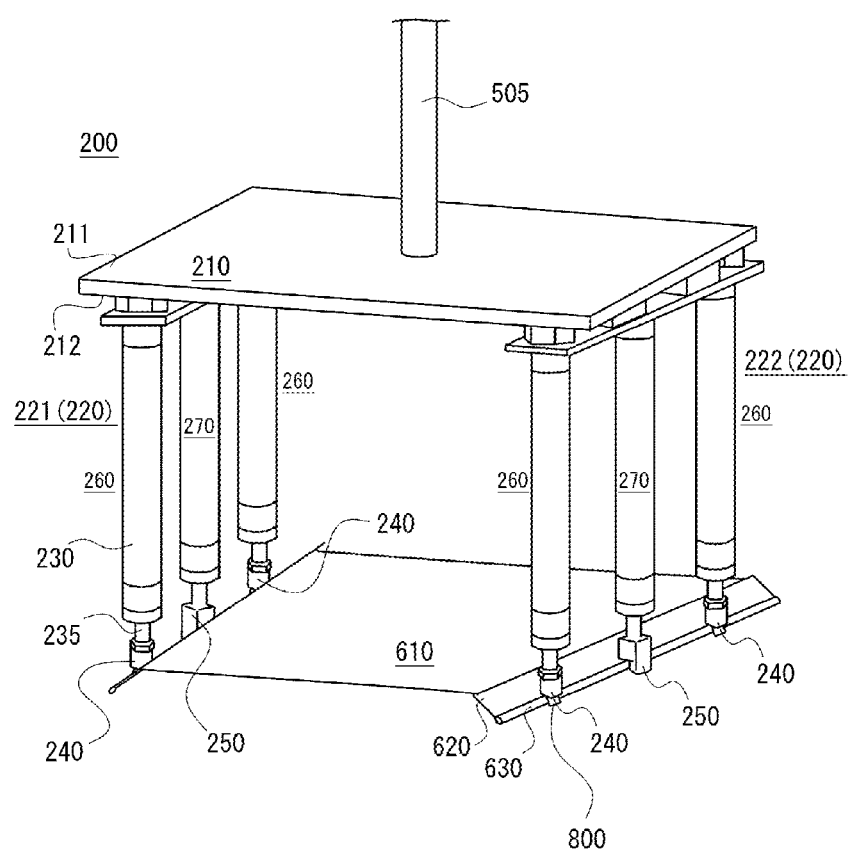
FIG. 2 is a schematic perspective view of a cover holder in a cover attaching device according to a first embodiment of the present invention, which schematically illustrates a cover held by the cover holder.
Figure 3:
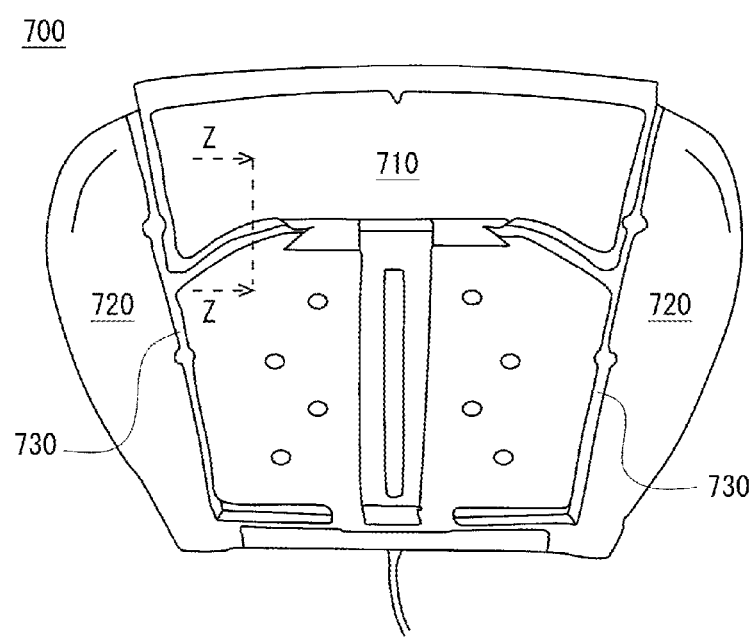
FIG. 3 is a schematic top view of a seat body to which a cover is attached by a cover attaching device according to a first embodiment of the present invention.
Figure 4:
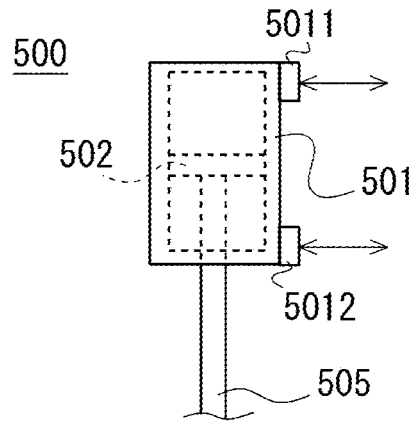
FIGS. 4(a) and 4(b), collectively referred to as FIG. 4, are explanatory views showing a configuration example of a distance adjusting means in a cover attaching device according to a first embodiment of the present invention.
Figure 4:
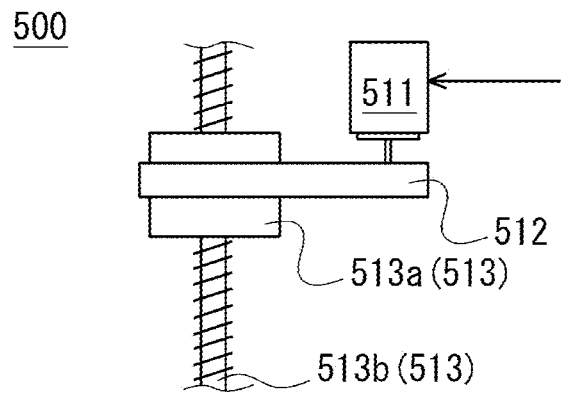
Figure 5:
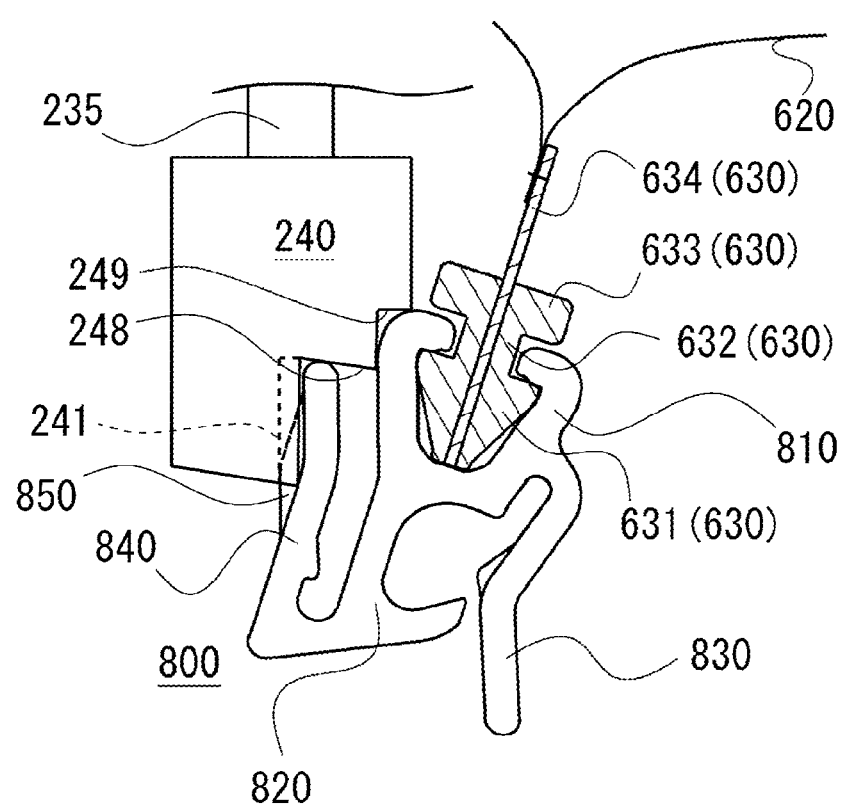
FIG. 5 is a schematic view showing a state where a clip has been grasped by a clip gripping body in a cover attaching device according to a first embodiment of the present invention.
Figure 6:
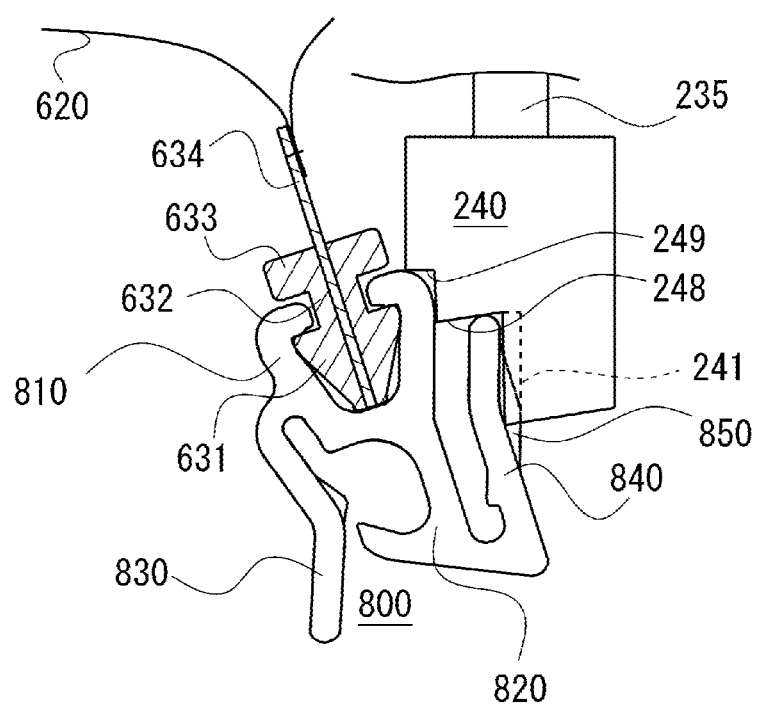
FIG. 6 is a schematic view showing a state where a clip has been grasped by a clip gripping body in a cover attaching device according to a first embodiment of the present invention.
Figure 7:
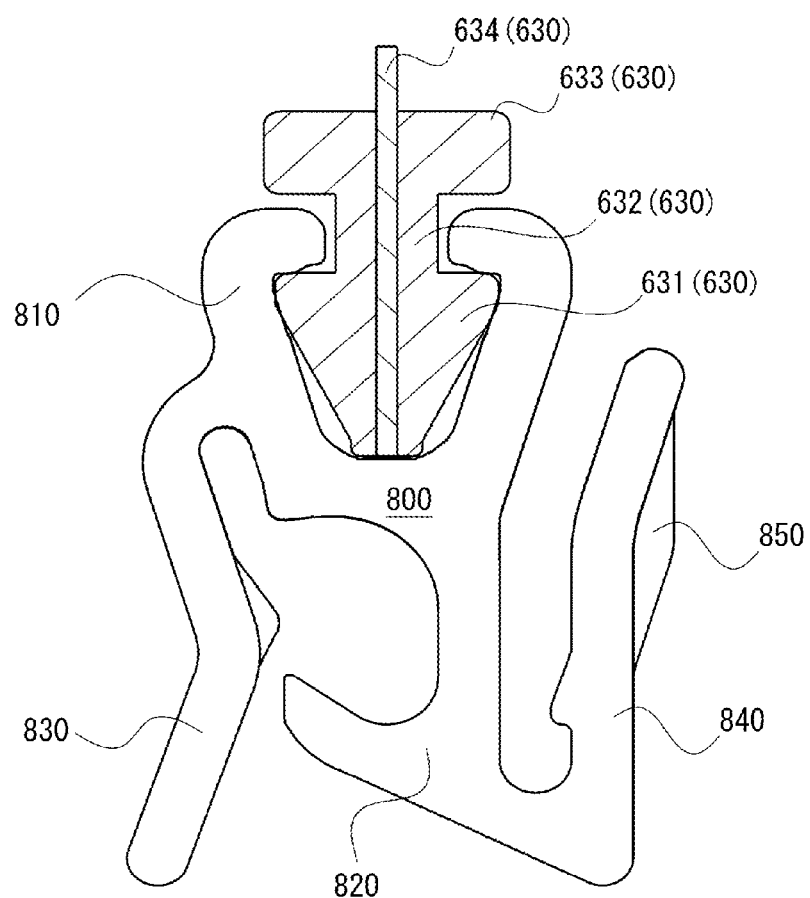
FIG. 7 is a schematic view showing configuration of a clip handled by a cover holder in a cover attaching device according to a first embodiment of the present invention.
Figure 8:
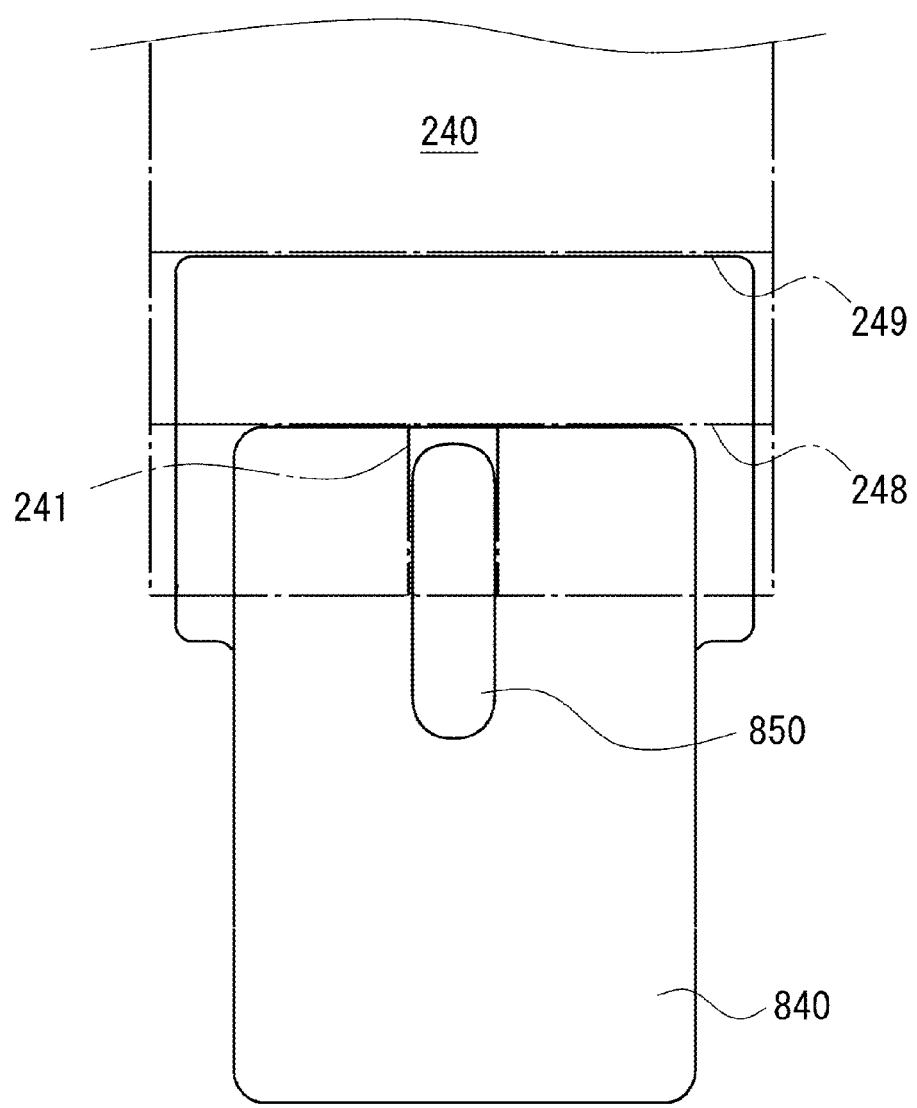
FIG. 8 is a schematic view showing configuration of a clip handled by a cover holder in a cover attaching device according to a first embodiment of the present invention.
Figure 9:
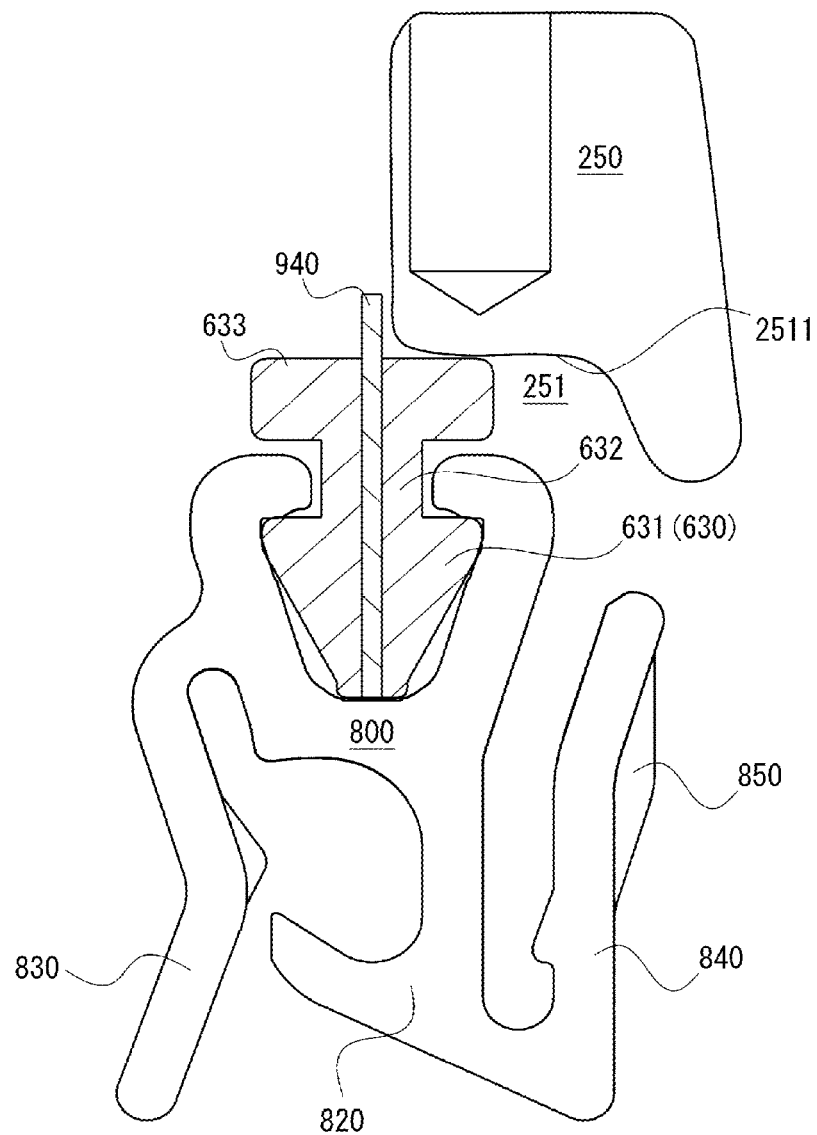
FIG. 9 is an explanatory drawing for explaining a movement of a pushing body in a cover attaching device according to a first embodiment of the present invention.
Figure 10:
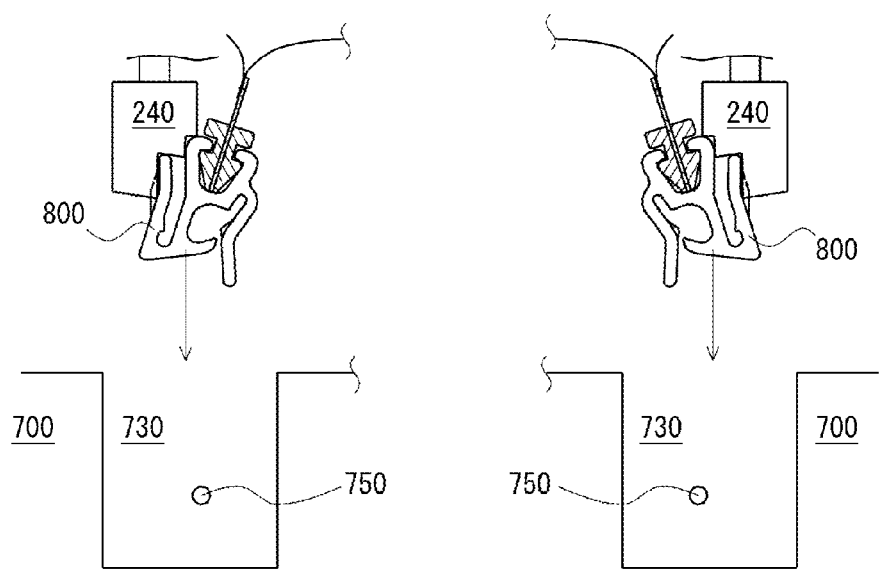
FIG. 10 is a process drawing showing steps of engaging a clip on the cover side with a wire on the seat body side by a cover attaching device according to a first embodiment of the present invention.
Figure 11A:
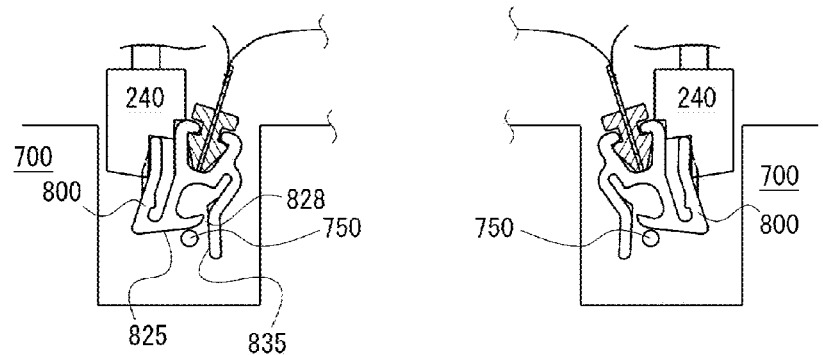
FIGS. 11(a) and 11(b), collectively referred to as FIG. 11, are a process drawings showing steps of engaging a clip on the cover side with a wire on the seat body side by a cover attaching device according to a first embodiment of the present invention.
Figure 11B:
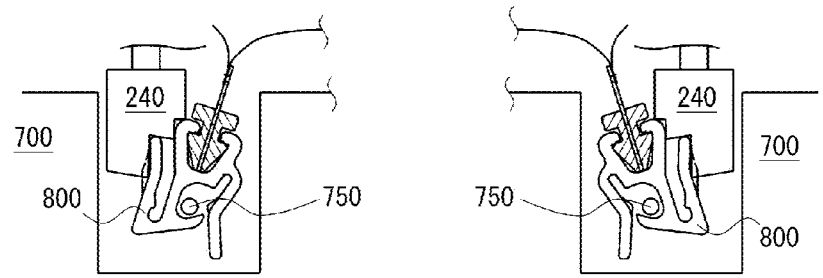
Figure 12:
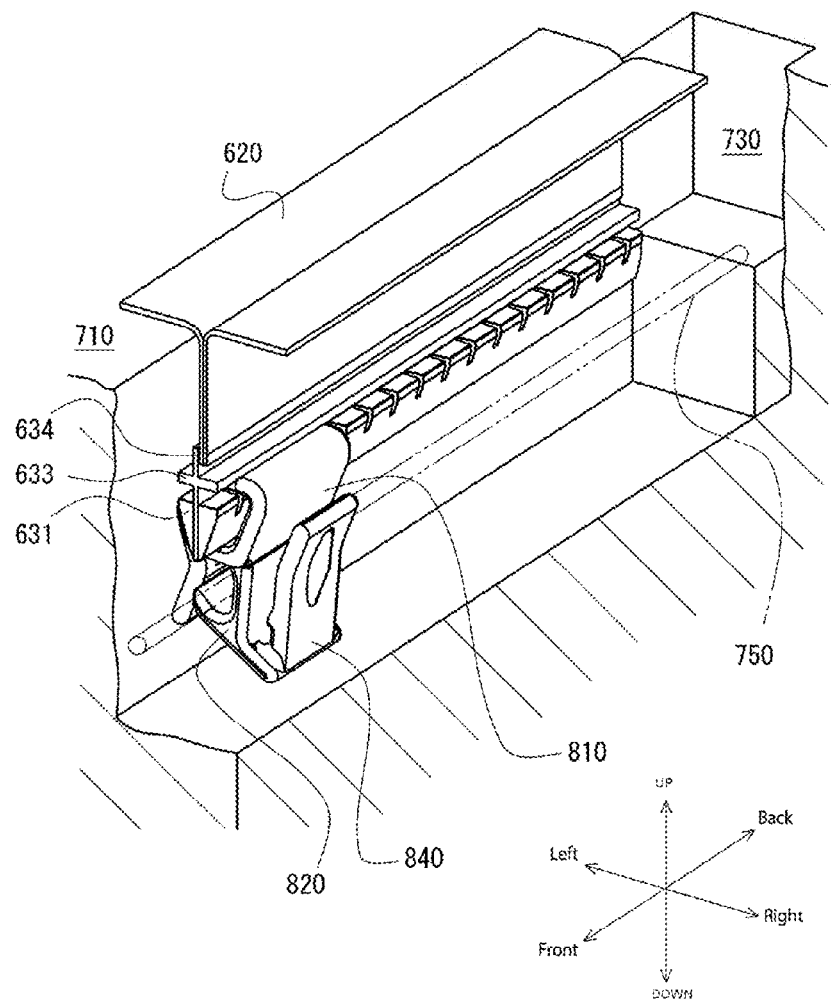
FIG. 12 is a schematic view showing a state where a clip on the cover side has been engaged with a wire on the seat body side by a cover attaching device according to a first embodiment of the present invention and the cover has been attached to the seat body.

The first embodiment will be described with reference to FIGS. 1 to 12. FIG. 1 is a schematic view showing schematic configuration of a cover attaching device, which schematically shows a cover holder and a table in a perspective view, and which schematically shows other configuration by blocks. It is noted that in this figure, it shows a state where a cover has been held on the cover holder, and a seat body indicated by dotted lines was placed on the table. FIG. 2 is a schematic perspective view of a cover holder in a cover attaching device, which schematically illustrates the cover held by the cover holder. FIG. 3 is a schematic top view of a seat body to which a cover is attached by a cover attaching device. FIG. 4 is an explanatory view showing a configuration example of a distance adjusting means in a cover attaching device. FIG. 5 is a schematic view showing a state where a clip has been grasped by a clip gripping body in a cover attaching device. FIG. 6 is a schematic view showing a state where a clip has been grasped by a clip gripping body in a cover attaching device. FIG. 7 is a schematic view showing configuration of a clip handled by a cover holder in a cover attaching device. FIG. 8 is a schematic view showing configuration of a clip handled by a cover holder in a cover attaching device. FIG. 9 is an explanatory drawing for explaining the movement of a pushing body in a cover attaching device. FIG. 10 is a process drawing showing steps of engaging a clip on the cover side with a wire on the seat body side by a cover attaching device. FIG. 11 is a process drawing showing steps of engaging a clip on the cover side with a wire on the seat body side by a cover attaching device. FIG. 12 is a schematic view showing a state where a clip on the cover side has been engaged with a wire on the seat body side by a cover attaching device and the cover has been attached to the seat body.

As shown in FIG. 1, a cover attaching device 100 includes a cover holder 200, a table 300, a control device 400, and a distance adjusting means 500. The cover holder 200 includes one or more clip holding means capable of holding at least one clip. The cover holder 20 is configured to hold the cover 600 via the clip being held by that clip holding means. A seat body 700 is placed on the table 300. The distance adjusting means 500 is configured to adjust a distance between the cover holder 200 and the table 300 in response to an instruction from the control device 400.

In the illustrative embodiment shown, the distance adjusting means 500 is configured to move the cover holder 200 toward the table 300, thereby narrowing the distance between them. The distance adjusting means 500 may operate in a state where the seat body 700 has been placed on the table 300 and the cover 600 has been held on the cover holder 200 so that the cover 600 held on the cover holder 200 may approach toward the seat body 700 placed on the table 300. The operation of the distant adjusting means 500 causes the clip of the cover 600 held on the cover holder 200 to be brought into engagement with the seat body 700. This may facilitate efficient attachment of the cover 600 to the seat body 700.

In another embodiment (not shown), the distance adjusting means 500 may move the table 300 toward the cover holder 200, thereby narrowing the distance between them, so that the clip of the cover 600 held on the cover holder 200 may engage with the seat body 700 side.

Specific configuration of the clip holding means that can hold at least one clip may be arbitrary and should not be limited to the disclosed examples in the present application. For example, one U-shaped clip holding means may be provided, and the clip may be held by each of two opposing sides of the U shape. The clip may be held by suction, magnetic attraction or the like. The clip may be held on the clip holding means by application of suction or magnetic attraction, and by stopping the application thereof, the clip may be released from the clip holding means.

In an illustrated embodiment of the present application, the clip holding means may be a clip gripping means, which is namely equal to a clip gripping body 240 and an axial clip gripper 260. The grasping of the clip by the clip gripping means may be performed in any manner and its manner may be determined depending on the shape of the clip as needed. It would be not essential whether or not the clip holding means or the clip gripping means is shaped to be axial.

In another embodiment (not shown), a robot hand may be employed as the clip gripping means. The robot hand has a plurality of fingers with an articulated structure and can grasp the clip by autonomous or external control.

The seat body 700 to which the clip at the cover 600 side is to be engaged may have any configuration, and as one non-limiting example, a wire illustrated in the figures of this application may be adopted. A clip that engages with the clip at the cover side may be provided on the seat body to ensure attachment of the cover 600 to the seat body 700 by the clips being engaged one another. A recess to which a protrusion of the clip at the cover side is to be snap-fitted may be provided on the seat body to ensure attachment of the cover 600 to the seat body 700 by the recess being engaged with the protrusion.

The term "table 300" should be maximally broadly understood, and is intended to include, but not limited to, a table such as a pedestal, for example, a conveyor on which the seat body 700 is to be placed, such as a belt conveyor. It would be sufficient to allow that the seat body 700 can be placed thereon. In another example, the table 300 is intended to include a column arrangement structure in which a plurality of columns are arranged so that the seat body 700 can be placed thereon. In one non-limiting example, the table 300 may be provided with a positional displacement prevention means for preventing positional displacement of the seat body 700. The positional displacement prevention means may be belts, for example.

Regarding the cover attaching device 100 in FIG. 1 and the like, solely for the convenience of description, terms indicating directions will be defined as follows. An up and down direction corresponds to a direction of movement of the cover holder 200. A front-back direction is orthogonal to the up and down direction and parallel to the arrangement direction of axial members in the line arrangement as described below. A left-right direction is orthogonal to the upper and lower direction and the front-back direction. The front-back direction may be also parallel to a direction to which the wire of the seat body 700 appropriately placed on the table 300 extends. Each direction may be redefined by another way in light of the following explanation.

As shown in FIGS. 1 and 2, the cover holder 200 may include a flat plate portion 210 oriented orthogonally in the up and down direction and a pair of line arrangements 220 spaced apart in the left-right direction. The flat plate portion 210 may be provided for planar arrangement of the line arrangements 220 and may be also provided to receive the power from the distance adjusting means 500 at one or more points. The line arrangement 220 may include an axial clip gripper 260 as described below, and may include non-limitingly and additionally an axial clip pusher 270.

As shown in FIGS. 1 and 2, the flat plate portion 210 may have a top surface 211 and a bottom surface 212 as a pair of main surfaces, and may assumes a rectangular shape when viewed from the top. The flat plate portion 210 may be, for example, a metal plate, but may be light resinous. The pair of line arrangements 220 may be comprised of a left side line arrangement 221 and a right side line arrangement 222, and a space corresponding to the right and left width of the cover 600 is provided between them. The left and right line arrangements may be referred to as first and second line arrangements in some cases.

As can be seen with reference of FIG. 2, each of the left and right line arrangements 220 may include one or more axial clip grippers 260. The axial clip gripper 260 may comprise a cylinder 230 extending in up and down, and a clip gripping body 240 fixed to the lower end of a movable shaft 235 of the cylinder 230. By attaching the clip to the clip gripping body 240, the clip 800 will be gripped by the clip gripping body 240. It should be noted that the clip gripping body 240 removably grips the clip 800. Regarding the removable capability, for example, the elasticity of the clip 800 or the elasticity of the clip gripping body 240 can be utilized.

In the exemplary embodiment shown, the clip gripping body 240 may be a block body, for example, a resin block produced by molding a resin, or a metal block produced by die-casting a metal. The attachment of the clip 800 to the clip gripping body 240 which is the block body can be relatively easily carried out via human hands.

Each of the left and right line arrangements 220 may include one or more axial clip pushers 270. More exactly, one or more axial clip grippers 260 may be replaced by the axial clip pushers 270, thereby reducing the time required for attaching the clip.

The axial clip pusher 270 may include a cylinder 230 extending in up and down and a clip pushing body 250 fixed to the lower end of a movable shaft 235 of the cylinder 230. In the exemplary embodiment illustrated, the clip pushing body 250 may be a block body, for example, a resin block produced by molding a resin, or a metal block produced by die-casting a metal.

For the number of axial members 260, 270 included in each line arrangement 220, each line arrangement 220 may include one or more axial clip grippers 260, and each line arrangement 220 may include no or one or more axial clip pushers 270. The number of axial members included in each line arrangement 220 may be arbitrary, and may be two, three, four, or five or more. Incidentally, for the sake of precaution, the term "axial member" is a term encompassing the axial clip gripper 260 and the axial clip pusher 270 by way of example.

In a non-limiting exemplary embodiment shown in FIG. 2, a total of three axial members of two axial clip grippers 260 and one axial clip pusher 270 are linearly arranged in each line arrangement 220. In another embodiment, the axial clip gripper 260 and the axial clip pusher 270 may be arranged in other manners such as zigzag in the same line arrangement 220. By including a plurality of axial clip grippers 260 in the same line arrangement 220, the posture of the cover 600 can be stabilized.

In a non-limiting exemplary embodiment shown in FIG. 2, the axial clip grippers 260, in other words, the clip gripping bodies 240, are placed so as to correspond to the four corners or nooks in the planar space of the flat plate portion 210 which can be understood when the flat plate portion 210 is viewed from the top or bottom surface, so that the over 600 can be stretched to an appropriate extent between them.

The cylinder 230 included in each axial member may be of any type, and may be, for example, a single acting cylinder or a double acting cylinder. Needless to say, the cylinder 230 may be a bar-like member extending in the up and down direction. The upper end of the cylinder 230 may be directly or indirectly fixed to a bottom surface 212 of the flat plate portion 210. The clip gripping body 240 or the clip pushing body 250 may be fixed to the lower end of the cylinder 230. Coupling the clip gripping body 240 to the flat plate portion 210 via the cylinder 230 may allow the clip gripping body 240 to be placed downwardly apart from the bottom surface 212 of the flat plate portion 210 by a certain distance. This also applies to the clip pushing body 250.

As will be apparent to a person skilled in the art, the cylinder 230 may not be necessarily a requisite, and the axial clip gripper 260 and the axial clip pusher 270 of the axial members may be configured without it. In another exemplary embodiment, the clip gripping body 240 or the clip pushing body 250 may have the length equal to that of the cylinder 230, and the cylinder 230 is omitted.

As will be apparent from the descriptions as discussed hereafter, the engagement of the clip 800 with the seat body 700 side, that is, the wire 750 may be achieved through movement of the cover holder 200 toward the side of the table 300 based on the operation of the distance adjusting means 500. However, the clip 800 may be engaged with the wire 750, using the adjustment of the length of the cylinder 230 included in the cover holder 200.

The distance adjusting means 500 may lower the whole cover holder 200 to lower the clip gripping body 240 and the clip pushing body 250. On the other hand, the cylinder 230 in the cover holder 200 may lower, by extension of itself, the clip gripping body 240 and the clip pushing body 250.

In a non-limiting exemplary embodiment, the cover holder 200 may be lowered to a predetermined position based on the operation of the distance adjusting means 500, and then the clip gripping body 240 and the clip pushing body 250 are further lowered by the operation of the cylinder 230, so that the clip 800 may be brought into engagement with the wire 750 at the seat body 700 side. It would be not essential that the engagement of the wire 750 with the clip 800 is completed by the cover holder 200 being lowered by the distance adjusting means 500.

The clip gripping body 240 can detachably grasp the clip 800. The specific configuration of the clip gripping body 240 can be appropriately changed depending on the shape of the clip 800. The clip pushing body 250 may be configured to be capable of directly or indirectly pushing the clip 800. The specific configuration of the clip pushing body 250 can be appropriately changed depending on the shape of the clip 800 or the shape of the structure around the clip 800. In one example, the clip gripping body 240 and the clip pushing body 250 are metallic or resinous and may be harder than the clip 800.

When mounting the cover 600 to the cover holder 200, an operator may need to perform work for attaching the clip 800 to the clip gripping body 24. The time required for this attaching work tends to increase as the number of the clip holders 24 increases. In view of this point, the clip gripping body 240 may be replaced with the clip pushing body 250 as mentioned above to reduce the time required for attaching the clip to the clip gripping body 240. The clip pushing body 250 cannot grasp the clip, but it can directly or indirectly act on the clip to push it. Therefore, even if the clip is not gripped by the clip pushing body 250, the clip 800 can be pushed toward the wire 750 of the seat body 700 as with the clip gripping body 240.

As shown in FIG. 2, the cover 600 can be illustrated to include a cover body 610, a drawing tape 620 extending in the front-rear direction, and an attached portion 630 extending in the front-rear direction. The drawing tape 620 may be sewed by sewing threads along left and right side edge portions of the cover body 610, and may be drawn into groove portions 730 in the seat body 700 as described below. The attached portion 630 may comprise a rod portion extending in the front-rear direction and coupled to the drawing tape 620.

A clip 800 to be engaged with the wire 750 on the seat body 700 side may be attached to the attached portion 630. In one embodiment, once the clip 800 is attached to the attached portion 630, the clip 800 cannot be easily detached from the attached portion 630. In the exemplary embodiment shown, the attached portion 630 is sandwiched by a pair of arms of the clip 800, thereby avoiding the clip 800 from being detached from the attached portion 630.

The seat body 700 may be a seat portion for a movable object, for example, as schematically shown in FIG. 3, and includes a central portion 710 for supporting a human body, and left and right raised portions 720 that are provided on the left and right sides of the central portion 710 and that can support the human body from the both sides. Elongated groove portions 730 extending in the front-rear direction are provided between the central portion 710 and the left and right raised portions 720, and wires 750 extending in the same front-rear direction are embedded in the groove portions 730. In a non-limiting exemplary embodiment, the clip 800 is engaged with the wire 750 of the seat body 700 and the cover 600 is attached to the seat body 700.

The distance adjusting means 500 can adopt various mechanisms as illustrated by FIG. 4. In a non-limiting exemplary embodiment, the distance adjusting means 500 comprises a linear drive means that can move a shaft portion in the up and down direction, which extends in the up and down direction.

In the example shown in FIG. 4 (*a*), the distance adjusting means 500 may comprise a cylinder including a cylinder tube 501, a piston 502 and a piston rod 505, and can feed out the piston rod 505 which is a shaft portion. In a preferred embodiment, the distance adjusting means 500 may be an air cylinder, which can displace the piston rod 505 in the up and down direction vertically by supplying air to each chamber separated by the piston 502 in the cylinder tube 501. The cylinder tube 501 may be provided with intake and exhaust ports. The piston rod 505 may be connected to the center of the top surface 211 of the flat plate portion 210 of the cover holder 200 and can apply power to the cover holder 200. In the embodiment shown in FIGS. 1 and 2, the distance adjusting means 500 in FIG. 4 (*a*) is adopted.

Another example shown in FIG. 4 (*b*) may be adopted. In this case, the distance adjusting means 500 may comprise a motor 511, a power transmission system 512, and a ball screw 513. The motor 511 may be a stepping motor, for example. The power generated by the stepping motor may be supplied to a nut 513*a* of the ball screw 513, thereby rotating a screw rod 513 *b* with respect to the nut 513*a* in a position fixed state. The screw rod 513*b* may be displaced in the up and down direction vertically while rotating. Only the movement in the upper-lower and vertical directions among the movement of the screw rod 513*b* can be transmitted to the cover holder 200 via a relay mechanism, thereby displacing the cover holder 200 in the up and down direction vertically. In this example, it can be understood that the screw rod 513*b* is the shaft portion. In a non-limiting exemplary embodiment, it is engaged with a gear at the tip of the rotating shaft of the motor 511 and a belt fixed to the nut is adopted as the power transmission system 512.

The distance adjusting means 500 of various mechanisms may be employed. One or more combination of pinions and racks may be adopted.

As shown in FIGS. 5 and 6, the clip gripping body 240 can grasp a protrusion 850 of the clip 800. The protrusion 850 of the clip 800 is an example of a portion to be grasped by the clip gripping body 240. The clip gripping body 240 is configured not to interfere with the clip 800 when the clip gripping body 240 grasps the clip 800, so that the clip 800 can be prevented from falling off from the clip gripping body 240 after the clip gripper grasps the clip 800.

In an exemplary embodiment shown, the clip gripping body 240 includes a recessed gripping portion 241 that can grasp the protrusion 850 of the clip 800 by pinching. By pressing the protrusion 850 of the clip 800 into the recessed gripping portion 241, the clip 800 may be gripped by the clip gripping body 240. It should be noted that the clip 800 may be detachable from the clip gripping body 240, and the clip 800 can be detached from the clip gripping body 240 by displacing the cover holder 200 upward after engaging the clip 800 with the wire 750 of the seat body 700. The clip 800 can be manually detached from the clip gripping body 240 at any time.

In a non-limiting exemplary embodiment, the clip gripping body 240 may be provided with one or more contact surfaces that can be contacted with the clip 800 to press down the clip 800. The illustrative clip gripping body 240 shown is stepped to avoid interference with the clip 800, and two stepped surfaces 248, 249 are provided accordingly. The stepped surface 248 may be the contact surface that can be contacted with the jig engaging portion 840 of the clip 800 to press down the jig engaging portion 840. The stepped surface 249 may be positioned above the stepped surface 248 and may be the contact surface that can be contact with a pinching portion 810 of the clip 800 to press down it. Providing the clip gripping body 240 with the contact surfaces of the clip 800 can ensure more reliable engagement of the clip with the seat body side.

In addition, as illustrated in FIGS. 7 and 8, the clip 800 comprises a pinching portion 810 that can pinch the attached portion 630 of the cover 600 by a pair of arms; a hook portion 820 connected to the bottom surface of the bottom portion connecting the pair of arms; a retaining portion 830 connected to the pinching portion 810 to prevent disengagement of the wire from the hook portion 820; a jig engaging portion 840 connected to the hook portion 820 and extending toward the pinching portion 810; and a protrusion 850 provided on the jig engaging portion 840. In the pinching portion 810, the respective arms are bent so that the upper end portions of the pair of arms come close to each other, thereby preventing detachment of the attached portion 630 disposed in the pinching portion 810. The retaining portion 830 and the jig engaging portion 840 are provided on opposite sides of the hook portion 820.

The attached portion 630 may comprise a tip portion 631 having a triangular cross section, which is sandwiched between the arms of the pinching portion 810; an intermediate portion 632 disposed in an opening between the upper end portions of the arms of the pinching portion 810; and a wall portion 633 which is provided on the pinching portion 810 and is wider than the opening of the pinching portion 810. The attached portion 630 may comprise a tape 634 sewn on a drawing tape 620, and the tip portion 631, the intermediate portion 632 and the pinching portion 810 are fixed to the tape 634. The tape 634 may be omitted and the attached portion 630 may be directly integrated with the drawing tape 620.

As shown in FIG. 9, the clip pushing body 250 can push down the wall portion 633 of the attached portion 630 to which the clip 800 being attached, that is, the clip 800 can be pushed down via the attached portion 630. The clip pushing body 250 may be provided with a recessed portion 251 so as not to interfere with the clip 800 and the attached portion 630, and can be brought into contact with the wall portion 633 of the attached portion 630 at the bottom surface 2511.

Steps of engaging the clip 800 of the cover 600 with the wire 750 of the seat body 700 will be described with reference to FIGS. 10 and 11. First, a sufficient distance may be provided between the table 300 and the cover holder 200 so that the cover 600 can be held by the cover holder 200 via the clip 800. For example, the control device 400 sends an instruction to the distance adjusting means 500 to locate the cover holder 200 at the initial position in response to an input by an operator. The distance adjusting means 500 causes the cover holder 200 to be located at the initial position in response to the instruction received from the control device 400. In the initial position, the cover holder 200 is sufficiently spaced apart from the seat body 700 on the table 300 and/or the table 300.

When the cover holder 200 is in the initial position, the cover 600 may be mounted to the cover holder 200 by an operator. For example, first, the clip 800 may be attached to the attached portion 630 included in the cover 600. The protrusion 850 of the clip 800 is then pressed into the recessed gripper 241 of the clip gripping body 240, and the clip 800 is grasped by the clip gripping body 240. The cover 600 is thus mounted to the cover holder 200 via the clip 800. After attaching the clip 800 to the clip gripping body 240, the clip 800 may be engaged with the attached portion 630.

Next, the seat body 700 may be placed on a predetermined position of the table 300. To prevent positional displacement of the seat body 700 on the table 300, the seat body 700 may be fixed on the table 300 by a positional displacement prevention means such as a belt. The seat body 700 may be placed on the table 300 prior to mounting the cover 600 to the cover holder 200.

Next, the cover holder 200 may be moved downward toward the table 300 to allow the cover 600 held by the cover holder 200 to come close to the side of the seat body 700 on the table 300. The control device 400 may transmit an instruction to the distance adjusting means 500 to lower the cover holder 200 to the engagement position in response to an input by the operator. In response to the instruction received from the control device 400, the distance adjusting means 500 may lower the cover holder 200 to the engagement position. For example, the distance adjusting means 500 may control intake and exhaust airs so that the piston rod 505 of the air cylinder extends downwardly from the piston rod 505 by a predetermined length.

During displacing the cover holder 200 from the initial position to the engagement position, the clip 800 gripped by the clip gripping body 240 of the cover holder 200 approaches the wire 750, and the clip 800 finally captures the wire 750 to guide and hold the wire 750 in the clip 800. The lowering of the cover holder 200 can allow a plurality of clips 800 to be engaged with the wires 750 simultaneously, and it is expected that the working time required for engaging the clip 800 with the wire 750 can be shortened.

Again, the clip gripping body 240 and the clip pushing body 250 may be displaced downwardly by operating the cylinder 230 of the axial member in the cover holder 200. The control device 400 can send an instruction to the cylinder 230 to unlock and operate the cylinder 230 at any timing or at a pre-scheduled timing. The cylinder 230 operates in response to this received instruction, and its movable shaft 235 extends downward.

If any anxiety remains as to whether or not engagement of the clip 800 with the wire 750 could be ensured only by moving down the cover holder 200 based on the operation of the distance adjusting means 500 as mentioned above, the cylinder 230 may be unlocked after moving down the cover holder 200 by the distance adjusting means 500, and the movable shaft 235 of the cylinder 230 may be extended downwardly to displace downwardly the clip gripping body 240 and the clip pushing body 250 fixed to the lower end of the movable shaft 235 of the cylinder 230, thereby ensuring more reliable engagement of the clip 800 with the wire 750.

As discussed above, the cover holder 200 may be lowered to the predetermined position based on the operation of the distance adjusting means 500, and then the clip gripping body 240 and the clip pushing body 250 are further lowered by the operation of the cylinder 230, whereby the clip 800 may be engaged with the wire 750 on the seat body 700 side. In other words, the downward displacement of the cover holder 200 by the distance adjusting means 500 may be used in combination with the downward displacement of the clip gripping body 240 and the clip pushing body 250 by the cylinder 230 to ensure the engagement of the clip 800 with the wire 750. The coordinated operation of the distance adjusting means 500 and the cylinder 230 can be achieved by control with the control device 400.

In an exemplary embodiment shown, the shape of the clip may be formed to be suitable for capturing the wire. As shown in FIG. 11(a), a slope surface 825 of the hook portion 820 and a slope surface 835 of the retaining portion 830 may be provided in a tapered shape that narrows toward a wire inlet 828, which may allow more reliable capture of the wire 750. The wire 750 may be guided to the wire inlet 828 through the slope surface 825 of the hook portion 820 or the slope surface 835 of the retaining portion 830 and may be inserted into the hook portion 820 as shown in FIG. 11 (b), thereby completing engagement of the clip 800 with the wire 750. After attaching the cover 600 to the wire 750 of the seat body 700 via the clip 800, the cover holder 200 may be lifted by the operation of the distance adjusting means 500. In an example, the clip 800 may be detached from the clip gripping body 240 due to the lifting of the cover 200, and the cover 600 may be separated from the cover holder 200.

Then, the cover 600 may be optionally stretched along the surface of the seat body 700 on the table 300, and the seat body 700 may be covered with the cover 600. Then, if needed, the cover 600 may be further fixed to the seat body 700 by any way such as adhesive bonding or sewing.

FIG. 12 shows a state where the clip 800 attached to the cover 600 has been engaged with the wire 750 of the seat body 700.

<Second Embodiment>

Figure 13:
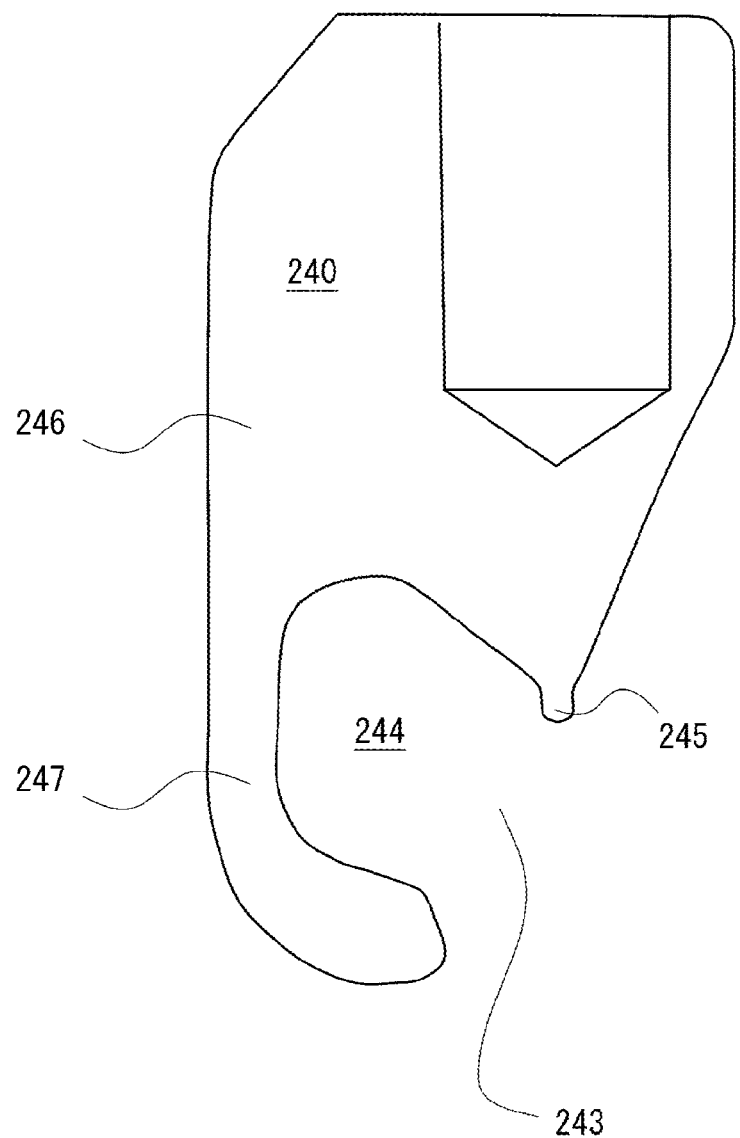
FIG. 13 is a schematic side view of a clip gripping body in a cover attaching device according to a second embodiment of the present invention.
Figure 14:
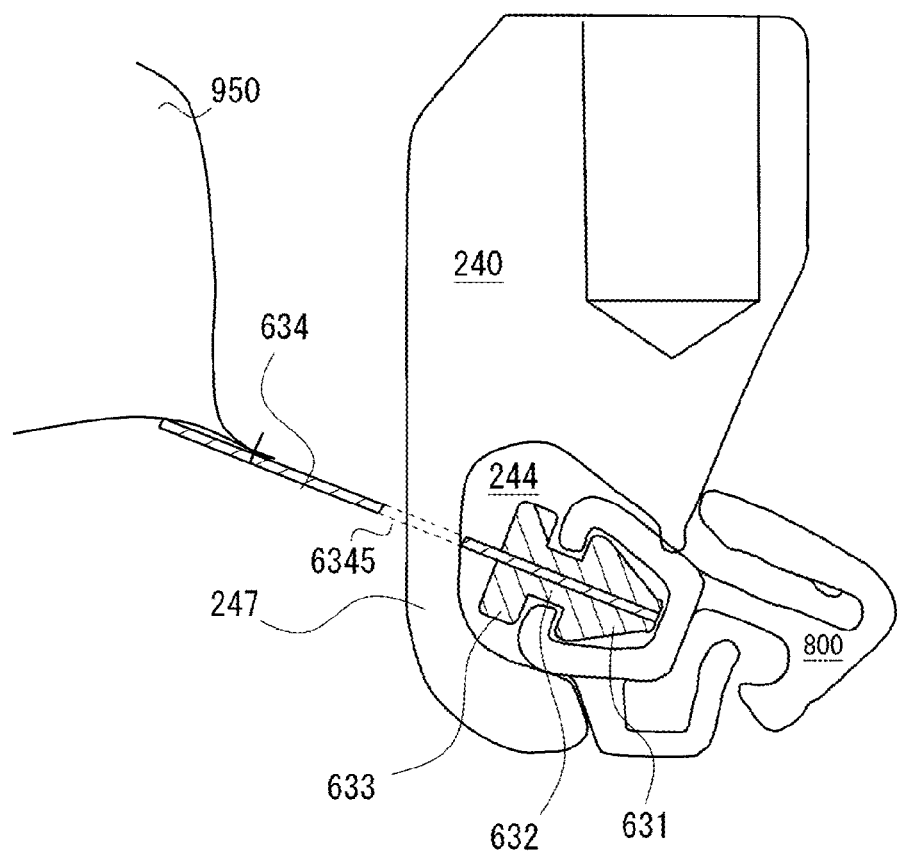
FIG. 14 is a schematic side view of a clip gripping body in a cover attaching device according to a second embodiment of the present invention, which schematically illustrates a state where a clip has been grasped.
Figure 15:
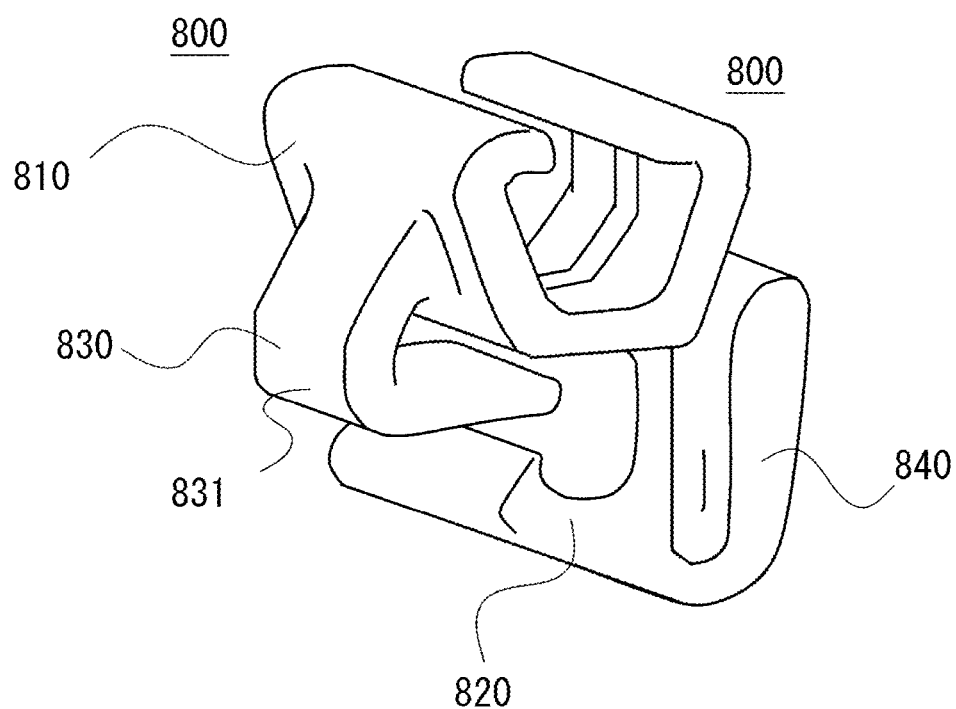
FIG. 15 is a schematic perspective view of a clip handled by a cover holder in a cover attaching device according to a second embodiment of the present invention.
Figure 16:
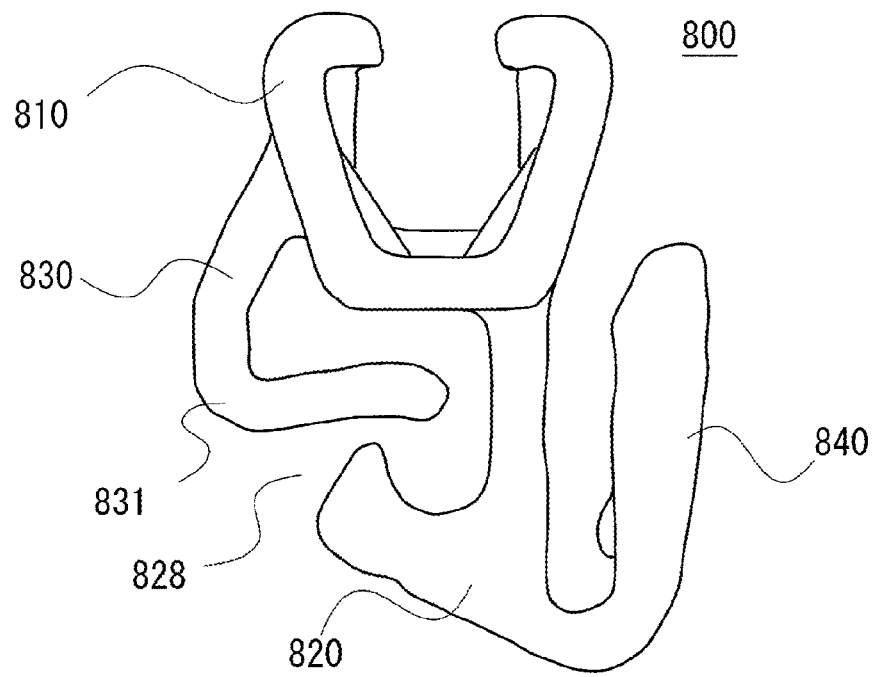
FIG. 16 is a schematic side view of a clip handled by a cover holder in a cover attaching device according to a second embodiment of the present invention.

A second embodiment will be described with reference to FIGS. 13 to 16. FIG. 13 is a schematic side view of a clip gripping body in a cover attaching device. FIG. 14 is a schematic side view of a clip gripping body in a cover attaching device, which schematically shows a state where the clip has been gripped. FIGS. 15 and 16 are schematic perspective views of clips handled by a cover holder in a cover attaching device.

In this embodiment, the clip gripping body 240 does not grasp the protrusion 850 of the clip 800, but grips the pinching portion 810 of the clip 800. Thus, the pinching portion 810 of the clip 800 may be a gripped portion to be grasped by the clip gripping body 240. Even in such a case, effects similar to those described in the first embodiment may be also obtained. Furthermore, the structure of the clip 800 may be different from that of the first embodiment. Even in such a case, effects similar to those described in the first embodiment may be also obtained.

The clip gripping body 240 shown in FIG. 13 may be configured to be able to grasp the pinching portion 810 of the clip 800 as schematically shown in FIG. 14. The pinching portion 810 may include a structure in which a pair of arms is disposed opposite to each other, and during attaching each of the arms to the clip gripping body 240, respective arms are pivotally moved to easily narrow the distance, so that the clip 800 can be rapidly attached to the clip gripping body 240.

The clip gripping body 240 may include a tongue portion 247 that may define a holding space 244 of the clip 800 between main body portions 246, and an entrance 243 for the pinching portion 810 of the clip 800 is defined between the tip portion of the tongue portion 247 and the main body portion 246. The main body portion 246 of the clip gripping body 240 may be provided with a protrusion 245 that may define the entrance 243 together with the tip portion of the tongue portion 247, and this protrusion 245 prevents the clip 800 from coming off the clip gripping body 240. In addition, as schematically shown in FIG. 14, the tape 634 of the attached portion 630 may be provided with an opening 6345 for avoiding interference with the tongue portion 247 of the clip gripping body 240.

As shown in FIGS. 15 and 16, the retaining portion 830 may comprise a bent portion 831 which is bent greatly, for example at a right angle so as to extend into a hook space defined by the hook portion 820. A relatively wide wire inlet 828 is provided between the bent portion 831 and the hook portion 820 to ensure insertion of the wire 750 into the hook portion 820.

<Third Embodiment>

Figure 17:
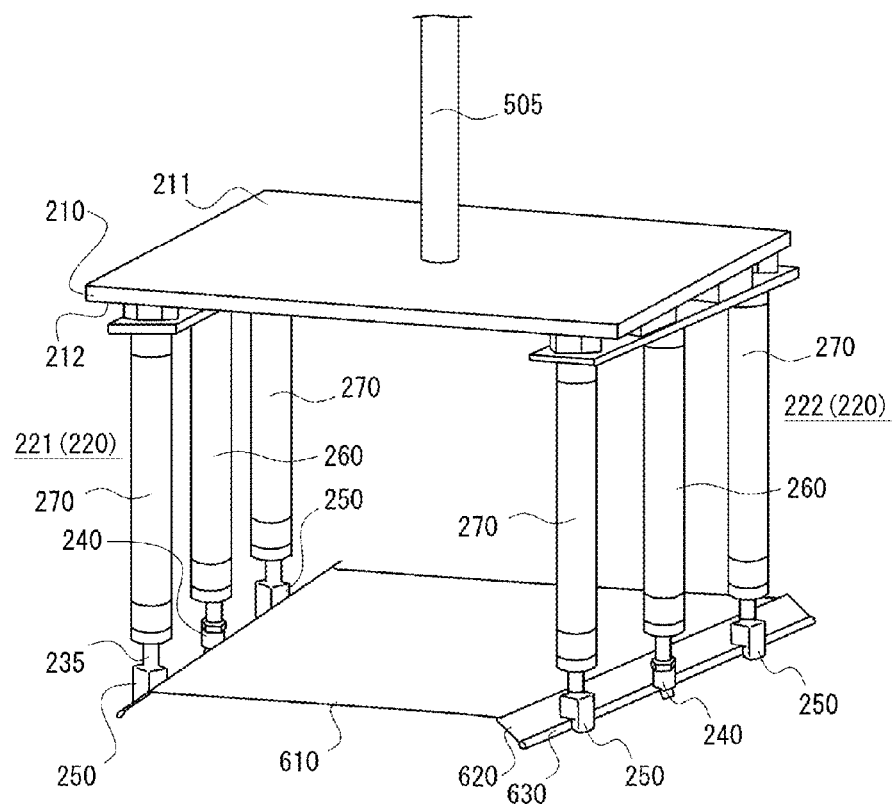
FIG. 17 is a schematic perspective view of a cover holder in a cover attaching device according to a third embodiment of the present invention, which schematically illustrates a cover held by the cover holder.

A third embodiment will be described with reference to FIG. 17. FIG. 17 is a schematic perspective view of a cover holder in a cover attaching device, which schematically illustrates the cover held by the cover holder.

In this embodiment, only one clip gripping body 240 is included in each line arrangement 220. In this case, the time required for attaching the clip 800 to the clip gripping body 240 can be further shortened.

As shown in FIG. 17, in each line arrangement 220, one axial clip gripper 260/clip gripping body 240 and two axial clip pushers 270/clip pushing bodies 250 may be provided. In each line arrangement 220, one axial clip gripping portion 260/clip gripping body 240 may be provided between the two axial clip pushers 270/clip pushing bodies 250, so that the cover 600 can be stably held at the center of the front-rear direction.

<Fourth Embodiment>

Figure 18:
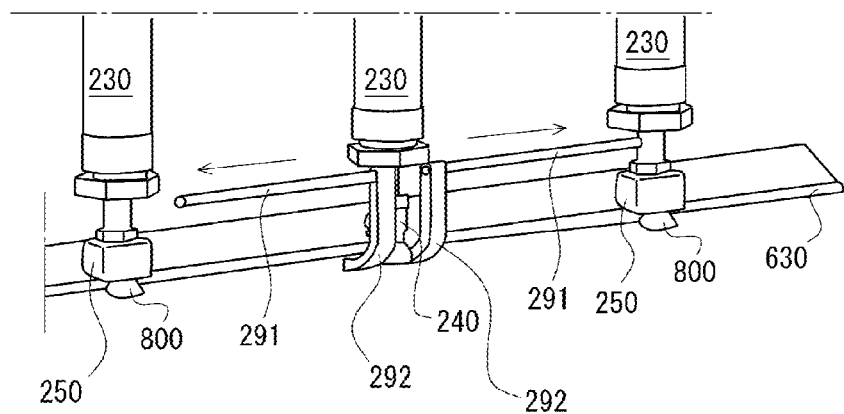
FIG. 18 is a schematic partial enlarged view of a cover holder in a cover attaching device according to a fourth embodiment of the present invention, which shows a support member disposed in contiguity with a clip gripping body and its operation mode.

A fourth embodiment will be described with reference to FIG. 18. FIG. 18 is a schematic partial enlarged view of a cover holder in a cover attaching device according to a fourth embodiment of the present invention, which shows a support member disposed in contiguity with a clip holder and its operation mode.

In this embodiment, the support member 292 capable of supporting the attached portion 630 is provided on the cover holder 200. The support member 292 supports the bottom surface of the attached portion 630. Furthermore, this support member 292 is movable along a guide 291 extending in the front-rear direction along the attached portion 630. If the number of clip gripping bodies 240 included in each line arrangement 220 is reduced, it is expected that it will be difficult to ensure an appropriate posture of the cover 600 while being held by the cover holder 200. Even in such a case, the posture of the cover 600 while being held by the cover holder 200 can be appropriately maintained by providing the cover holder 200 with the support member 292 for supporting the attached portion 630 which is a part of the cover 600. The support member 292 may be movable along a guide 291 extending in the front-back direction along the attached portion 630, so that the positioning of the support member 292 can be adjusted depending on situations, or can respond to changes in the type of the covers 600.

As shown in FIG. 18, the cylinder 230 positioned at the center in the front-rear direction within the line arrangement 220 may be provided with a rod-like guide 291 extending in the front-rear direction along the attached portion 630, and the guide 291 may be provided with J-shaped support members 292. The lower end of the support members 292 may be curved around the bottom surface of the attached portion 630 so as to bear the bottom surface thereof. In general, the attached portion 630 may tend to hang down as it extends away from the clip gripping body 240. The support member 292 may be movable along the guide 291 and can support the attached portion 630 of the cover 600 at an appropriate position by moving the support member 292 along the guide 291 in a direction away from the clip grip 240. The support member 292 may be formed in any structure, and also may be U-shaped, L-shaped, and the like.

<Fifth Embodiment>

Figure 19:
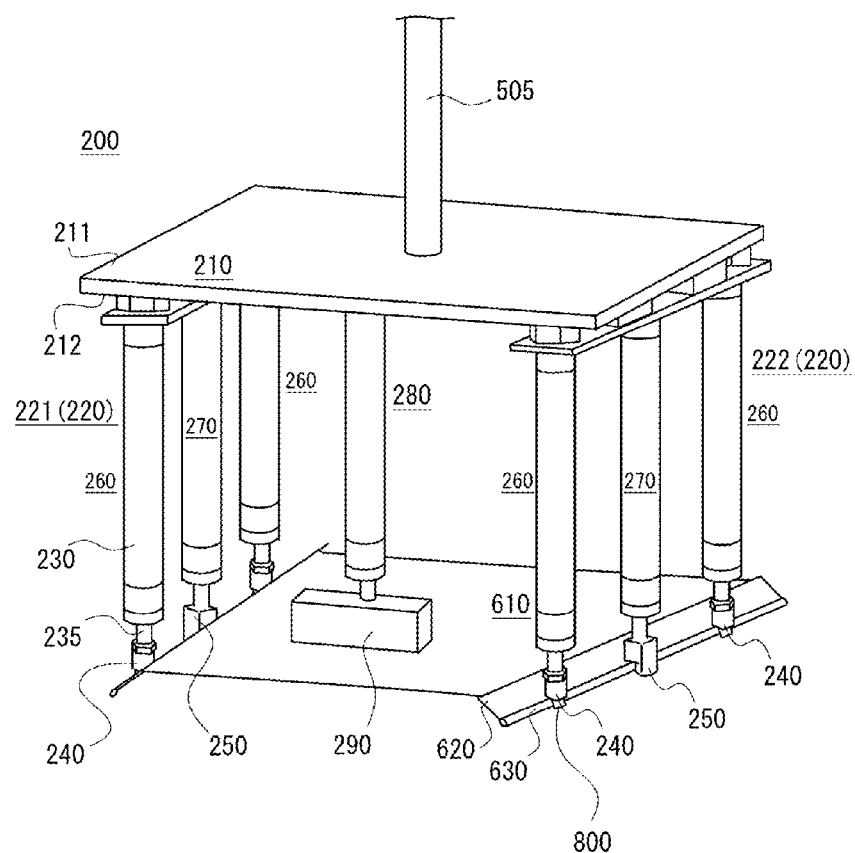
FIG. 19 is a schematic perspective view of a cover holder in a cover attaching device according to a fifth embodiment of the present invention, which illustrates a pushing means that can push a cover body downward between left and right line arrangements, i.e., toward a seat body.
Figure 20:
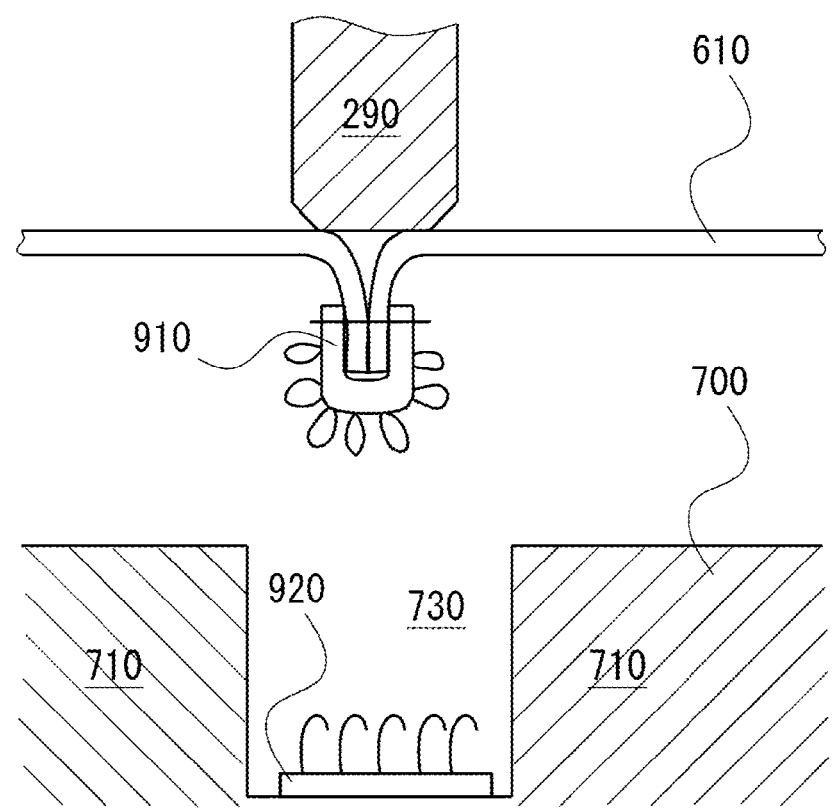
FIG. 20 is a partial schematic cross-sectional view of a cover holder in a cover attaching device according to a fifth embodiment of the present invention, which illustrates the process of engaging a female surface fastener of the cover body with a male surface fastener by operation of the pushing means.

A fifth embodiment will be described with reference to FIGS. 19 and 20. FIG. 19 is a schematic perspective view of a cover holder in a cover attaching device, which illustrates a pushing means that can push a cover body downward between left and right line arrangements, i.e., toward a seat body. FIG. 20 is a partial schematic cross-sectional partial view of a cover holder in a cover attaching device, which illustrates the process of engaging a female surface fastener of a cover body with a male surface fastener by operation of the pushing means.

In this embodiment, the cover holder 200 may be provided with a pushing means/a pushing mechanism which may act to push a cover body 610 instead of the clip 800. This may allow additional engagement between the cover 600 and the seat body 700 to be ensured.

To be distinguished from the means/mechanism for pushing the clip, a modifier such as second, another or additional may be added to the term of the means/mechanism for pushing the cover body, in addition to or as an alternative to the case where it explicitly states that subjects to be pushed are different.

The additional engagement between the cover 600 and the seat body 700 should not be limited to the engagement of between surface fasteners (hook-and-loop fasteners) as described below, but may also include any other engagement such as adhesive bonding, magnetic attracting and the like. Needless to say, the surface fastener may be of any type or structure.

As shown in FIG. 19, an axial cover body pusher 280 as an example of the above described pushing means is provided between the left and right line arrangements 220 of the cover holder 200. The cover body pusher 280 may be an axial member provided with a pushing piece 290 at the lower end of the movable shaft of the cylinder 230, and can be extended by unlocking the cylinder 230.

The cylinder 230 of the cover body pusher 280 may be provided parallel to the cylinder 230 of the axial clip gripper 260 and the axial clip pusher 270. The pushing piece 290 may be a resin, a metal or a composite of both, for example, and may have a certain degree of hardness, but may have any degree of flexibility. The pushing piece 290 may be a rectangular parallelepiped block extending in the left-right direction, but in other embodiments it may be provided in other shapes and forms.

By the moving down of the cover holder 200 and/or the operation of the cylinder 230, the cover body 610 of the cover 600 held by the cover holder 200 may be pushed downward by the pushing piece 290 and then pressed into the groove portion 730 of the seat body 700. A surface fastener 910 may be provided on the bottom surface of the cover body 610 which is to be pushed into the groove portion 730 by the pushing piece 290, and this surface fastener 910 can be brought in to engagement with a surface fastener 920 of the other one of a pair which has been provided on the bottom of the groove portion 730.

The pushing piece 290 can be sufficiently displaced downward by the operation of the cylinder 230, but not necessarily limited thereto. In another embodiment, the cylinder 230 does not operate, the length of the cover body pusher 280 is merely set in an appropriate manner: during the cover holder 200 being lowered, the cover body 610 is pushed into the groove portion 730 by the pushing piece 290. The three-dimensional shape of the seat body 710 may be considered within a range where additional engagement(s) should be performed, and then the number, position and length of the cover body pushers 280 shall be determined.

The schematic cross-sectional view illustrated in FIG. 20 schematically shows a partial cross section taken along the dotted line Z-Z in FIG. 3, for example. A male surface fastener 920 is fixed onto the bottom of the groove portion 730 extending in the left-right direction by adhesive bonding, sewing or the like. A female surface fastener 910 extending in the left-right direction is sewn to the cover body 610. The female surface fastener 910 and the male surface fastener 920 are engaged with one another by pushing the cover body 610 into the groove portion 730 with the pushing piece 290, thereby ensuring additional engagement of the seat body 700 with the cover 600. The positions of the male and female surface fasteners may be inverted.

Although the J-shaped engaging elements are shown for the male surface fastener 920, they are shown in a simplified manner for simplicity of illustration, but are not intended to show any exact array density or any exact arranged number of the engaging elements. Similarly, the engaging loops of the female surface fastener 910 is only shown in a simplified manner.

<Further Embodiment>

Each of the first to fifth embodiments as described above or any combination thereof may comprise a determining means/determining mechanism for determining whether or not the clip 800 has successfully engaged with the seat body 700 on the table 300. By means of this, defective attachment of the cover 600 can be monitored and appropriate measures can be taken during any failure occurrence. When the clip 800 is engaged with the wire of the seat body 700, vibrations and sounds are generated, which are utilized for detection of engagement.

The determining means/determining mechanism may comprise, for example, a detection unit and a determination processing unit that executes a determination process based on the output of the detection unit. The detection unit may comprise, for example, a vibration detection sensor(s). The determination processing unit may include an analog circuit, a digital circuit, a computer or any combination thereof. The computer may be configured to include an arithmetic processing unit such as a CPU and a storage unit including any type of information recording medium (a memory, hard disk, magnetic type or optical type information storage medium). A program stored in the storage unit is executed by the arithmetic processing unit, and various functions are executed, for example operation control of the vibration detection sensor(s) connected via the interface or processing of information inputted from the same sensor(s).

For example, the vibration detection sensor(s) included in the detection unit may be provided on the axial clip gripper 260 or the axial clip pusher 270, and detects vibration during engagement of the clip 800. The determination processing unit may have a storage unit in which vibrations generated during engagement of the clip 800 has been beforehand recorded as reference data. The determination processing unit compares the vibration data output from the vibration sensor(s) with the reference data mentioned above, and determines that the engagement has been successfully achieved if the both data have agreed with one another or have had high similarity. The determination processing unit determines that the engagement has failed if the both data have not agreed with one another or have not had high similarity. The determination of the degree of agreement for the vibration data may be understood as determination of the degree of agreement for vibration waveforms.

The determination process may be performed based on the determination of agreement or the degree of agreement for one or more singular/extraction points included in the vibration waveform, rather than the entire vibration waveform. The vibration detection sensor is an example, and the sound generated during engagement of the clip may be used as a criterion for determination. In this case, a sensor(s) for detecting sound is/are provided in place of the vibration sensor(s). Both vibration and sound may be detected and the determination may be performed for these.

A parson skilled in the art will be able to optimize the type, number and placed position of the sensors forming the detection unit according to requirements for implementation. A person skilled in the art will be able to optimally construct the determination processing unit based on hardware, software or a combination thereof. Any type of network can be included in the determination processing unit, and attachment of the clip can be remotely monitored.

In view of the above teachings, a person skilled in the art will be able to make various modifications. The reference numerals included in the claims are only for reference and should not be for the purpose of limiting the scope of claims. In the embodiments shown, one clip gripping body 240 grasps one clip 800, but it is also expected that one clip gripping means grasps two or more clips 800. In the cover holder 200, a combination of one axial clip gripper 260, a plurality of axial clip pushers 270 and one or more support members 292 is also expected.

The distance adjusting means 500 may be referred to as a distance adjusting mechanism or a distance adjusting device. The clip holding means may be referred to as a clip holding structure or a clip holder. The clip pushing means may be referred to as a clip pushing structure or clip pushing tool. The cover holder may be referred to as a cover suspender.

DESCRIPTION OF REFERENCE NUMERALS

100 cover attaching device
200 cover holder
210 flat plate portion
220 line arrangement
230 cylinder
240 clip gripping body (clip holding means, clip gripping means)
250 clip pushing body (clip pushing means)
260 axial clip gripper (clip holding means, clip gripping means)
270 axial clip pusher (clip pushing means)
280 cover body pusher
300 table
400 control device
500 distance adjusting means
600 cover
700 seat body
800 clip

What is claimed is:

1. A device for handling a cover, comprising:
a cover holder configured to hold the cover, the cover holder including two or more clip grippers, each clip gripper configured to grip a clip and each clip configured to hold an attachment portion of the cover; and
a distance adjuster configured to move the cover holder toward or away from a seat body so as to adjust a distance between the cover holder and the seat body,
wherein the distance adjuster is configured to position the cover holder at a remote position where the cover holder holds the cover such that the cover and the clips are spaced apart from and outside the seat body, and
wherein the distance adjuster in configured to move the cover holder from the remote position towards the seat body while the cover holder holds the cover such that the clips holding the attachment portion of the cover and respectively gripped by the two or more clip grippers are moved closer to the seat body.

2. The device according to claim 1, wherein the cover holder further comprises a flat plate to which the two or more clip grippers are coupled, and the flat plate is disposed above the cover held by the cover holder.

3. The device according to claim 1, wherein each clip gripper is configured to pinch a protrusion of the respective clip.

4. The device according to claim 1, wherein the clip gripper is provided with a recessed gripping portion to which a protrusion of the clip is pressed into so that the clip is detachably gripped by the clip gripper.

5. The device according to claim 1, wherein each clip gripper comprises a cylinder, and a clip gripping body secured to an end of a shaft of the cylinder, and the clip gripper is configured to grip the clip such that the clip is inclined relative to an axial line along which the cylinder expands and contracts.

6. The device according to claim 1, wherein each clip gripper includes a clip gripping body made of plastic or metal.

7. The device according to claim 1, wherein the cover holder further comprises one or more clip pushers configured to push the attachment portion of the cover at a position where at least one additional clip is attached thereto.

8. The device according to claim 1, wherein each clip gripper comprises a cylinder and a clip gripping body secured to a movable shaft of the cylinder, and the clip grasped by the clip gripping body is moved toward the seat body in accordance with expansion of the cylinder.

9. The device according to claim 8, wherein each clip gripping body is provided with a recessed gripping portion to which a protrusion of the clip is pressed into so that the clip is detachably gripped by the clip gripper.

10. The device according to claim 1, further comprises a controller that instructs the distance adjuster to move the cover holder.

11. The device according to claim 10, wherein each clip gripper includes at least one cylinder and at least one clip gripping body axially movable based on actuation of the cylinder, and
the controller sends one or more instructions for controlling the respective cylinders of the respective clip grippers at least between expanded state and contracted state thereof.

12. The device according to claim 1, wherein each clip gripper is configured to release the clip, after the clip is engaged with a wire provided at the seat body, in accordance with operation of the distance adjuster for increasing the distance.

13. The device according to claim 12, wherein each clip gripper comprises a cylinder and a clip gripping body secured to an end of a shaft of the cylinder, and each clip gripper is configured to release the clip, after the clip is engaged with a wire provided at the seat body, in accordance with contraction of the cylinder.

14. The device according to claim 1, wherein each clip gripper comprises a cylinder and a clip gripping body secured to an end of a shaft of the cylinder, and based on at least one operation of the distance adjuster and the cylinders, the two or more clips gripped by the two or more clip gripping bodies are brought into engagement with the seat body.

15. A method for attaching a cover to a seat body using the device of claim 14.

16. The device according to claim 1, wherein the cover holder further comprises one or more clip pushers, wherein each clip pusher is configured to push the clip for engagement with the seat body.

17. The device according to claim 16, wherein each clip pusher comprises a cylinder and a clip pushing body secured to a movable shaft of the cylinder, and the clip pusher is configured such that the clip is pushed toward the seat body in accordance with expansion of the cylinder.

18. The device according to claim 16, wherein the cover holder includes a first linear arrangement in which the two or more clip grippers and the one or more clip pushers are arranged; and a second linear arrangement in which additional two or more clip grippers and additional one or more clip pushers are arranged.

19. A method for attaching a cover to a seat body, the method comprising;
attaching two or more clips to the cover, each clip configured to hold an attachment portion of the cover;
hanging the cover from a cover holder and positioning the cover holder at a remote position, the cover holder including two or more clip gripping bodies, each clip gripping body configured to grip a respective one of the two or more clips, the cover hanging from the cover holder and the two or more clips respectively gripped by the two of more clip grippers being spaced apart and outside the seat body at the remote position; and
narrowing a distance between the seat body and the cover hanging from the cover holder so that the two or more clips holding the attachment portion of the cover and gripped by the two or more clip gripping bodies are brought into engagement with the seat body.

20. The method for attaching the cover to the seat body according to claim 19, further comprising pushing another clip directly or indirectly by a clip pushing body of the cover holder.

* * * * *

UNITED STATES PATENT AND TRADEMARK OFFICE
CERTIFICATE OF CORRECTION

PATENT NO. : 10,508,018 B2
APPLICATION NO. : 15/318663
DATED : December 17, 2019
INVENTOR(S) : Tetsuya Fukuzawa et al.

It is certified that error appears in the above-identified patent and that said Letters Patent is hereby corrected as shown below:

On the Title Page

Item (54) and in the Specification, in Column 1, Line 3, in "Title", delete "COVER" and insert -- BODY --, therefor.

In the Claims

In Column 18, Line 21, in Claim 19, delete "comprising;" and insert -- comprising: --, therefor.

Signed and Sealed this
Twenty-eighth Day of July, 2020

Andrei Iancu
*Director of the United States Patent and Trademark Office*